May 16, 1933.  J. H. CROSBIE  1,909,337
RESILIENT SUPPORT
Filed Oct. 11, 1932
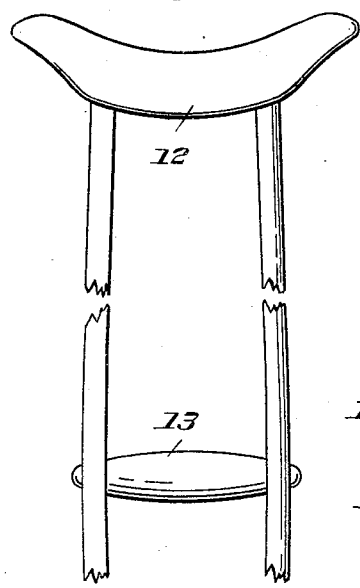
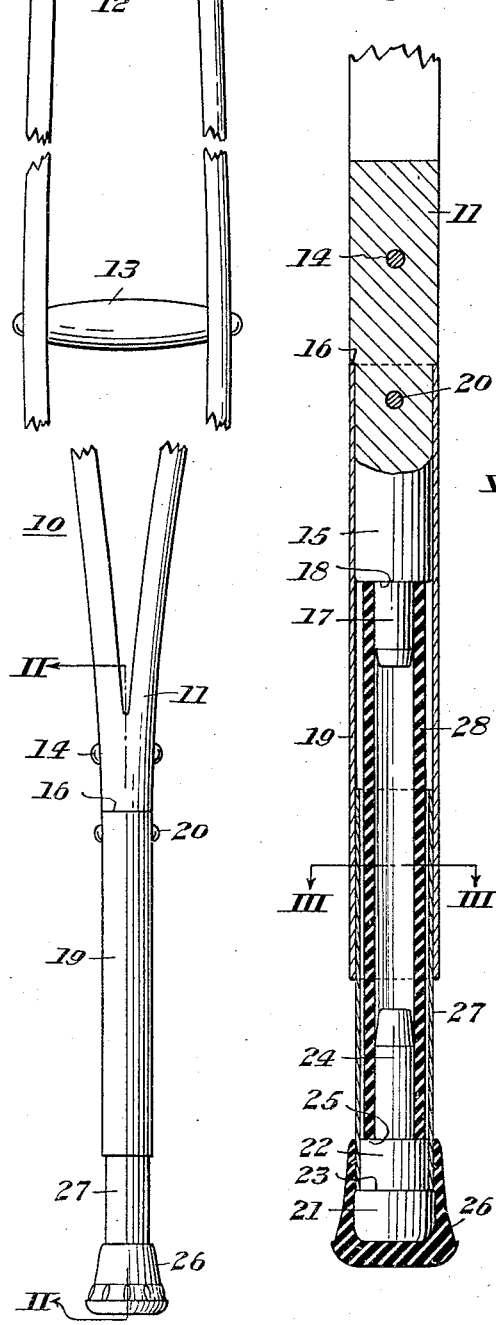
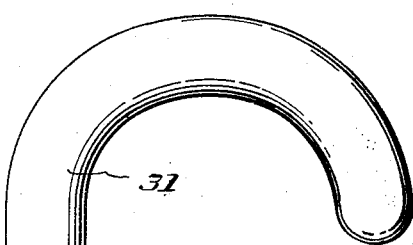
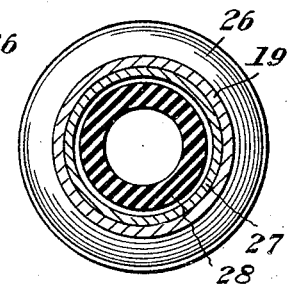
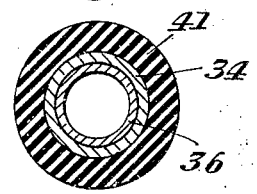
INVENTOR
John H. Crosbie
by his attorneys
Byrnes, Stebbins
Parmelee & Blenko Patented May 16, 1933

1,909,337

UNITED STATES PATENT OFFICE

JOHN H. CROSBIE, OF PITTSBURGH, PENNSYLVANIA; VIRGINIA A. CROSBIE EXECUTRIX OF SAID JOHN H. CROSBIE, DECEASED

RESILIENT SUPPORT

Application filed October 11, 1932. Serial No. 637,249.

My invention relates to a resilient support and, in particular, to devices such as canes, crutches and the like, provided with such supports, although the invention is not limited to this particular application.

It has been realized for a long time that, for the maximum of comfort, canes and crutches should have a certain amount of resilience. Numerous efforts have been made to provide these devices with resilient qualities. Rubber tips on canes and crutches, for example, have been widely used. Resilient springs have also been introduced into the shanks or shafts of crutches and canes in an effort to provide the desired resilience. Rubber tips have not solved this problem entirely because of the very limited degree of resilience which can be provided thereby. The spring devices have been objectionable because of their cost, weight and clumsiness.

I have invented a device applicable either to canes or crutches, for providing them with a degree of resilience such that they can be used a great deal more comfortably than at present. The desirability of considerable resilience in canes and crutches is well recognized by those compelled to use these articles and I am aware, as aforesaid, that many proposals along this line have heretofore been made. None of these, however, as far as I am informed, have been practical or successful, for the reasons stated.

In accordance with my invention, I incorporate in the shank or shaft of a crutch or cane, a loose or sliding connection between the upper and lower portions thereof and provide a rubber tube connecting such portions. The rubber tube, when subjected to the weight of the user, is compressed to a marked degree, thus giving the device a noticeable resilient quality which greatly adds to the comfort of the user.

For a complete understanding of the invention, reference is made to the accompanying drawing illustrating a present, preferred embodiment of the invention, together with a modification, although it is to be understood that the invention may be otherwise designed and constructed within the scope of my broader claims. In the drawing:—

Figure 1 is a side elevation of a crutch having the invention applied thereto;

Figure 2 is a sectional view along the line II—II of Figure 1;

Figure 3 is a sectional view along the line III—III of Figure 2;

Figure 4 is a view partly in elevation and partly in section of a cane having the invention incorporated therein; and Figure 5 is a sectional view along the line V—V of Figure 4.

Referring in detail to the drawing, and for the present, to Figures 1 through 3, a crutch 10 comprises the usual split shank 11, shoulder piece 12 and hand hold 13. A rivet 14 extends transversely through the shank below the split portion. The lower end of the shank 11 has a reduced portion 15 providing a shoulder 16 and a further reduced portion 17 providing a shoulder 18.

A sleeve 19 is fitted on to the reduced portion 15 of the shank 11 and abuts against the shoulder 16. The sleeve is secured to the shank by a rivet 20, or other suitable means.

A tip or foot for the crutch is indicated at 21 and comprises a plug having a reduced portion 22 forming a shoulder 23 and a further reduced portion 24 forming a second shoulder 25. A rubber cushion cup 26 is applied to the tip or plug 21. A sleeve 27 is fitted on to the reduced portion 22 of the plug 21 so as to abut against the shoulder 23. The sleeve 27 is slidably received within the sleeve 19.

A rubber or other resilient tube 28 extends between the shank 11 and the tip 21, being fitted on the reduced portions 17 and 24 thereof, abutting against the shoulders 18 and 25, respectively. The tube 28 may be ordinary rubber hose of any suitable size but should preferably be fairly resilient. I have found that ordinary garden hose provides a satisfactory rubber tubing for the purpose contemplated.

The parts of the device are preferably held together by securing the resilient tube 28 to the reduced portions 17 and 24 of the shank 11 and tip 21. The tube, for example, may be pinned to the reduced portions.

The operation of the device will probably be apparent from the foregoing description of the structure, but brief reference thereto may serve to explain some of the novel features more fully.

When the crutch is in use, the user's weight applied to the shoulder piece 12 and the hand hold 13 is transmitted to the shank 11 and, through the shoulder 18, to the upper end of the tube 28. The weight on the shank is sustained by the cushion cup 26 and the plug 21 through the shoulder 25 thereon, which is engaged by the lower end of the tube 28. The tube 28, being confined fairly closely within the sleeves 19 and 27, cannot bend or buckle but can only be deformed by axial compression. Such compression of the tube 28 provides a remarkable degree of resilience in the operation of the crutch. The slidable connection between the tip 21 and the shank 11 provided by the coaxial sleeves 19 and 27 permits the desired compression of the tube without any binding or jamming.

The reduced portions 17 and 24 of the shank 11 and the tip 21, respectively, are preferably of such size as to fit fairly tightly in the tube 28. Thus, when the tube 28 is compressed, the air column therein between the ends of the reduced portions 17 and 24 is also subject to compression and as a result, in addition to the cushioning effect of the compressible tube 28, the additional resilience of the air column under compression is also provided.

As the weight of the user is lifted from the crutch, the natural resilience of the tube 28 restores the latter to its normal length and forces the sleeve 27 outwardly of the sleeve 19. The tube 28 fits the reduced portions 17 and 24 fairly closely and, as a result, a pneumatic cushion of remarkable resilience is provided by the compression of the tube 28 with its air content practically sealed therein. Since the length of the tube 28 determines the length of the resilient section, it is easy to adjust the length of the cane or crutch by varying the length of the resilient tube. In hospitals, for example, a single pair of crutches can be accommodated to the use of different individuals by providing different lengths of resilient tube. The crutches can also be furnished with a resilient tube of sufficient length to permit the individual user to cut it off to the proper length for his own comfort.

It will be obvious from the foregoing description that the invention provides a highly satisfactory form of resilient crutch. A marked improvement over prior art devices is readily perceptible. In the first place, the device is quite inconspicuous since it is of a size corresponding to that of the crutch shank. The weight of the various parts is small and the entire device assembled adds little, if any, to the weight of the average crutch. The weight of the parts, in other words, is substantially the same as that of the portion of the shank which it replaces, the primary advantage of the invention is its low cost. The parts are few in number and simple in design so that they can readily be manufactured on a large scale at a very small cost. The boon of a resilient crutch is thus available to all dependent upon crutches, at a cost which is quite nominal.

The invention has another important advantage in that it can readily be applied to old forms of crutches. It is not necessary that the crutch be specially designed, but standard crutches now on the market or in use can be fitted very quickly and at small expense with the invention described. The crutch, when fitted with the device, is not made awkward or clumsy to use since its center of gravity and other characteristics are substantially unchanged so that the "feel" of the crutch is about the same as the unimproved form of the article.

The invention is also readily applicable to canes. Figures 4 and 5 illustrate this form of the invention. A cane 30 comprises a handle 31 with a shank having a reduced portion 32 providing a shoulder 33. A sleeve 34 is secured to the reduced portion 32 of the handle 31 by a pin 35 or other convenient means. A tube 36 is slidably received in the sleeve 34 and at its lower end, is slidably fitted into a tubular tip 37. The end of the tip 37 is closed by a plug 38 and the upper end thereof is reduced at 39 providing a shoulder 40.

A resilient tube 41 similar to that shown at 28 in Figure 2 surrounds the sleeve 34 and the reduced portion of the tip 37, bearing on the shoulders 33 and 40 of the handle and tube, respectively.

In operation, the rigidity of the tube 36 prevents the tube 41 from buckling or bending and the slidable relation between the tube 36, the sleeve 34 and the tip 37 permits the latter to telescope so that the weight applied to the handle 31 is sustained by the resilient tube 41. It will be apparent that the operation of the invention as applied to the cane is quite similar to that of the improved crutch. A difference in the construction is obvious, namely, that in the cane, the resilient tube is outside the rigid telescoping tubes, while the reverse relation obtains in the crutch. Either arrangement may be provided in the cane as well as the crutch.

All the aforementioned advantages characteristic of the crutch are also found in the cane. An added advantage of having the rubber tube on the exterior is that many interesting color and grain effects may be worked out in the resilient tube to simulate the character of various woods.

While the invention has been described with particular reference to crutches, canes and the like, it is clear that it may also be applied to other devices wherein resilient support is required. I have in mind such applications as the landing gear of airplanes, where a considerable degree of resilience is desired. Numerous other applications for the invention will doubtless occur to those skilled in the art.

Although I have illustrated and described herein but one form of the invention, together with a slight modification thereof, it will be apparent that numerous changes in the construction described may be made without departing from the spirit of the invention as set forth in the appended claims, or sacrificing any of the advantages above mentioned.

I claim:

1. In a support, a resilient section comprising spaced shank and tip portions, telescoping members on said portions for guiding axial movement thereof, and a resilient tube laterally supported by said telescoping members between said shank and tip portions.

2. A resilient foot for crutches comprising a sleeve attached to the crutch shank, a sleeve slidable relative thereto, a tip carried by said second sleeve, and a resilient tube between the shank and tip supported against lateral deformation by said telescoping sleeves.

3. A resilient cane comprising a handle, and a tip, a rigid telescopic connection between said handle and tip, and a resilient tube extending between the handle and tip supported against lateral deformation by said telescoping connection.

4. A resilient section for the shanks of crutches, comprising a sleeve secured to the shank, a tubular member slidable therein, a tip carried by said tubular member, and a resilient tube between said shank and tip supported against lateral deformation by said sleeve and tubular member.

5. A resilient section incorporated between the shank and tip of a crutch, comprising a telescoping connection between the shank and the tip, and a rubber tube for yieldably spacing the tip from the shank.

6. A resilient section incorporated between the shank and tip of a cane, comprising a rigid, telescoping connection between the tip and the shank, and a flexible, compressible tube disposed coaxially of said telescoping connection so as to be supported thereby against substantial lateral deformation for yieldably spacing the tip from the shank.

7. In a crutch, a shank, a foot spaced therefrom, telescoping sleeves attached to the foot and shank for guiding axial movement thereof, and a resilient tube coaxial with said sleeves for spacing the foot from the shank.

8. A resilient section for a cane, comprising a compressible, pneumatic cylinder between the shank and tube portions thereof.

9. A resilient section for a cane, comprising telescoping sleeves connecting the shank and tube portions thereof, and means providing an air cushion within said telescoping sleeves.

10. In a resilient section for crutches, adapted to be embodied therein between the foot and shank portions thereof, comprising a pneumatic cylinder on one of said portions and a plunger working in the cylinder, on the other.

11. In a resilient support, the combination with a rigid assembly of telescoping members, of a resilient tube disposed coaxially with the telescoping members for yieldably spacing said telescoping members.

In testimony whereof I have hereunto set my hand.

JOHN H. CROSBIE.